UNITED STATES PATENT OFFICE.

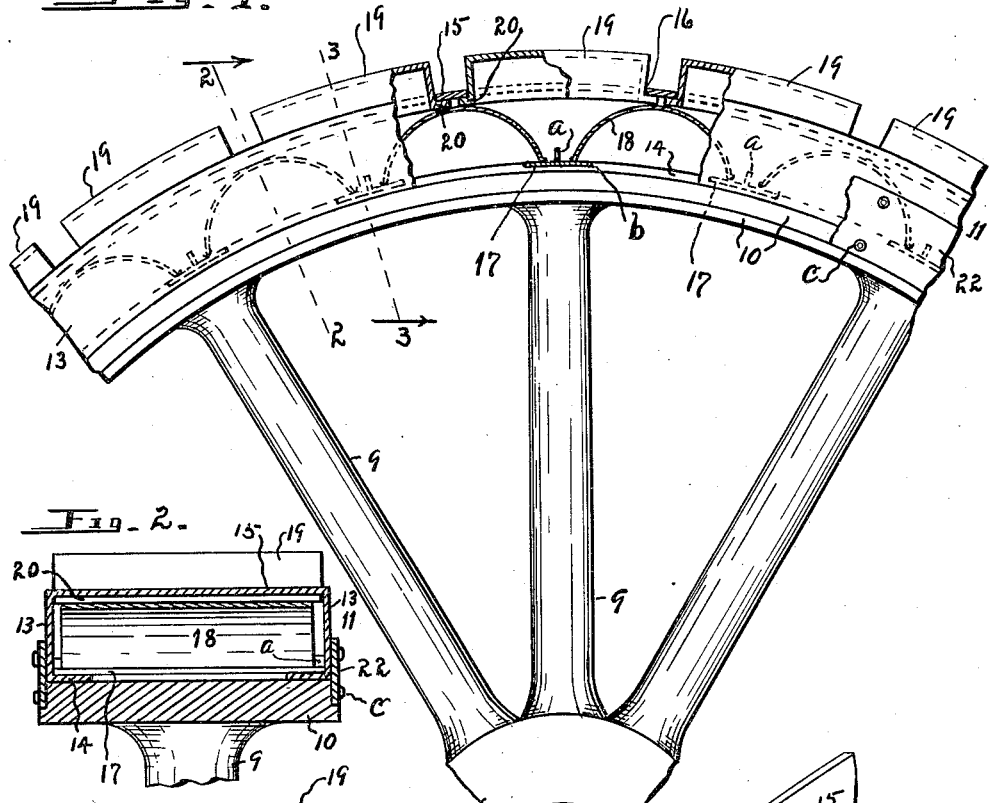

DON JUAN ARNOLD, OF OMAHA, NEBRASKA.

RESILIENT VEHICLE-TIRE.

1,139,323.   Specification of Letters Patent.   Patented May 11, 1915.

Application filed August 25, 1913. Serial No. 786,425.

*To all whom it may concern:*

Be it known that I, DON JUAN ARNOLD, a citizen of the United States, residing at Omaha, in the county of Douglas and State of Nebraska, have invented certain new and useful Improvements in Resilient Vehicle-Tires, of which the following is a specification.

This invention relates to improvements in resilient tires, and has for its object, broadly, to provide a tire which may be conveniently applied to vehicle wheels to prevent undue vibration to the axle, and to consist of few and simple parts so that manufacture will be economical.

The invention includes an annular housing or casing consisting of upright, substantially parallel side rims of sections connected at their peripheries at uniform, longitudinal intervals by means of cross plates, to thereby provide ways or apertures within which are placed plungers or tread-blocks for sustaining the weight of the wheel, bow-springs being employed for resisting the inward movement of the blocks or plungers for preventing the vibration mentioned. By reason of the provision and arrangement of these parts, a very durable and efficient construction is attained.

The invention consists of the novel construction, combination and arrangement of parts as described herein and claimed, and as illustrated in the drawing, wherein,—

Figure 1 is a broken view, partly in section, showing a part of a vehicle wheel, in side elevation. Fig. 2 is a transverse section on line 2 2 of Fig. 1. Fig. 3 is a transverse section on line 3 3 of Fig. 1. Figs. 4, 5 and 6 are enlarged details to clearly show the construction. Fig. 4 is a perspective view showing a part of the annular casing. Fig. 5 is a perspective view of a plunger or tread-block. Fig. 6 is a view of a tread-block in longitudinal section, as on line 6 6 of Fig. 5.

Referring now to the drawing for a more particular description, numerals 7, 8, 9 and 10 respectively indicate the axle, hub, spokes and felly of a vehicle wheel; and for purposes of the invention I provide a resilient tire 11 which may be readily mounted on the wheel tire, and to prevent creeping, it may be secured thereon by any suitable means.

The resilient tire consists, in part, of the housing member or annular casing 12, best shown in Fig. 4. This member consists of the upright, annular side-sections 13, each having a terminal inturned flange 14, said side-sections being connected at their peripheries by numerous cross-plates 15 to provide, therebetween, the apertures or ways 16.

At 17 are indicated numerous bearing-plates. They are disposed within and transversely of the casing, and are supported upon flanges 14. At 18 are indicated a plurality of springs, preferably formed concavo-convex in cross-section, or of bow-shape. They are interposed between the flanges 14 and cross-plates 15, their ends being supported by the bearing-plates, and each spring is of such length that its middle part is disposed adjacent to a cross-plate 15 of the casing.

At 19 are indicated a plurality of upright, hollow tread-blocks or plungers, each being provided at its ends with flanges 20. They have a form substantially conforming to and are adapted to be seated in apertures 16 of the casing, each of the flanges of a block being interposed between a spring and a cross-plate 15.

The springs are of such length and are so arranged that the flanges 20 of the blocks are pressed outwardly so that they are normally in engagement with the cross-plates, and it will be understood that when the vehicle wheel is rotating, and as the blocks successively bear the weight of the wheel, they will be pressed inwardly of the casing subject to the resistance of the springs, and will operate to prevent or materially decrease the vibration or shocks incident to the use of the wheel as first mentioned.

Each bearing-plate 17 is provided, midway between its edges, with a ridge *a* which projects outwardly between the ends of two adjacent springs, and as indicated at *b*, the flanges 14 are provided, at uniform longitudinal intervals, with depressions or recesses in which the plates 17 are disposed and by this construction the springs are maintained at uniform distances from each other; and each plate 17 may have an adequate width so that it will provide bearings for the springs, when depressed.

At 22 are indicated locking rings which may bear upon the vertical faces of the felly 10 and the sides 13 of the casing, and they may be secured thereon by means of keepers *c*.

The parts of the resilient tire thus described may be conveniently assembled, the blocks being passed outwardly, in apertures 16, until their flanges 20 bear upon the inner sides of the transverse plates 15; and the springs may then be disposed within the annular casing for engagement with flanges 20, the inner end of the springs being disposed upon the bearing plates.

It will be noted that each block 19 has bearings upon two springs which conduces to durability, and since the springs may have any desired elasticity, resilient tires may be provided for the wheels of light or heavy draft vehicles as may be required.

What I claim and desire to secure by Letters Patent is,—

In a resilient tire, the combination of a wheel rim, an annular casing consisting of a pair of upright circular side plates connected at longitudinal intervals by cross-plates and having inwardly projecting flanges at their inner edges provided with recesses, said casing being adapted to be disposed outwardly with its flanges engaging the wheel rim, bearing plates disposed in said recesses, each being provided with a ridge, a plurality of bow-springs, each being interposed between a cross-plate and the flanges of the casing for engagement of its ends with and intermediate the ridges of two adjacent bearing plates, a plurality of rectangular tread-blocks, each being disposed between the side plates and two adjacent cross-plates and provided at each of its ends with a flange for engaging between a cross-plate and one of said bow-springs, and means for connecting the side plates with the wheel rim.

In testimony whereof I have affixed my signature in presence of two witnesses.

DON JUAN ARNOLD.

Witnesses:
HIRAM A. STURGESS,
ARTHUR H. STURGESS.

Copies of this patent may be obtained for five cents each, by addressing the "Commissioner of Patents, Washington, D. C."